United States Patent
Shi et al.

(10) Patent No.: US 7,354,303 B2
(45) Date of Patent: Apr. 8, 2008

(54) WIRE HOLDER FOR FIXING ELECTRICAL WIRE IN ELECTRONIC DEVICE

(75) Inventors: Zheng Shi, Shenzhen (CN);
Guang-Yao Lee, Tu-Cheng (TW);
Chun-Chi Liang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,269

(22) Filed: Jul. 21, 2006

(65) Prior Publication Data

US 2007/0149066 A1   Jun. 28, 2007

(30) Foreign Application Priority Data

Dec. 28, 2005   (CN) .......................... 2005 2 0121442

(51) Int. Cl.
*H01R 13/72* (2006.01)
*H01R 25/00* (2006.01)

(52) U.S. Cl. ...................................... 439/501; 439/110

(58) Field of Classification Search ................ 439/752, 439/677, 110, 137, 399, 131, 501, 502, 623; 428/98, 99, 40.1, 35.7
See application file for complete search history.

(56) References Cited

U.S. PATENT DOCUMENTS

| | | | | |
|---|---|---|---|---|
| 4,984,982 A | * | 1/1991 | Brownlie et al. | 439/131 |
| 5,547,391 A | * | 8/1996 | Benes et al. | 439/399 |
| 6,249,636 B1 | * | 6/2001 | Daoud | 385/137 |
| 6,343,942 B1 | * | 2/2002 | Okamoto | 439/110 |
| 6,428,363 B2 | * | 8/2002 | Tamai et al. | 439/677 |
| 6,747,209 B2 | * | 6/2004 | Uchida et al. | 174/68.1 |
| 2001/0053636 A1 | * | 12/2001 | Tamai et al. | 439/677 |

* cited by examiner

*Primary Examiner*—Chandrika Prasad
(74) *Attorney, Agent, or Firm*—Wei Te Chung

(57) ABSTRACT

A wire holder for fixing one or more wires on a plate of an electronic device includes a pair of latches formed on the plate defining a guiding slot therebetween in a lateral direction for containing the one or more wires. Each of the latches includes a main body, and an elastic arm extending from an end of the main body in the lateral direction. Each of the elastic arms includes a latching portion extending from a free end thereof for hooking the wire.

7 Claims, 2 Drawing Sheets

WIRE HOLDER FOR FIXING ELECTRICAL WIRE IN ELECTRONIC DEVICE

CROSS-REFERENCES TO RELATED APPLICATION

Relevant subject matter is disclosed in the copending U.S. patent application filed on the same date and having a same title with the present application, which are assigned to the same assignee with this patent application.

FIELD OF THE INVENTION

The present invention relates to a wire holder, and more particularly to a wire holder in an electronic device.

DESCRIPTION OF RELATED ART

Typically, an electronic device such as a portable computer has a wire holding recess for fixing one or more wires therein. However, the wire holding recess may not fit the wires properly. If the wire holding recess is too wide, the wires are not fixed firmly and may fall out. If the wire holding recess is too narrow, the wires are fixed too firmly causing difficulty if they need to be removed, and the wires may be easily scraped during removal.

What is needed, therefore, is a wire holder in which wires are fixed firmly, but can still be easily removed when necessary.

SUMMARY OF THE INVENTION

An exemplary wire holder for fixing one or more wires on a plate of an electronic device includes a pair of latches formed on the plate defining a guiding slot therebetween in a lateral direction for containing the one or more wires. Each of the latches includes a main body, and an elastic arm extending from an end of the main body in the lateral direction. Each of the elastic arms includes a latching portion extending from a free end thereof for hooking the wire.

Other advantages and novel features will become more apparent from the following detailed description of preferred embodiments when taken in conjunction with the accompanying drawings, in which:

DETAILED DESCRIPTION OF THE INVENTION

Figure 1:
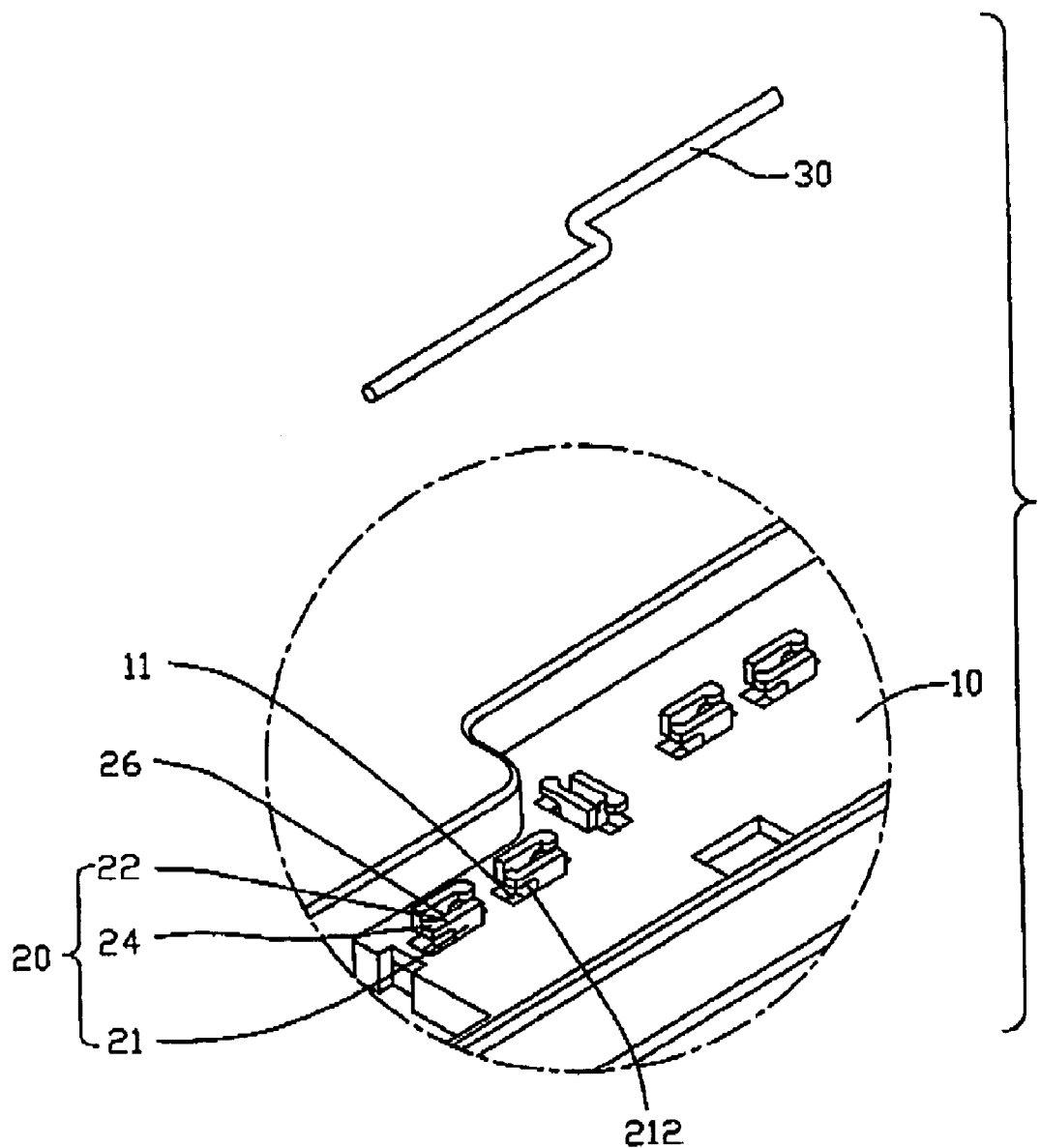
FIG. 1 is an exploded, isometric view of a wire holder and a wire in accordance with a preferred embodiment of the present invention.

Referring to FIG. 1, a wire holder for fixing a wire 30 on a plate 10 of an electronic device is provided in accordance with a preferred embodiment of the present invention. In other embodiments, the wire 30 may be more than one wire. The wire holder includes pairs of resilient latches 20 formed on the plate 10. In this embodiment, the electronic device is a portable computer, and the plate 10 is an inside surface of a panel of an enclosure of the portable computer.

Each latch 20 includes a main body 21 having a lateral surface, and a overhung generally L-shaped elastic arm 22 extending from the lateral surface of the main body 21. Each elastic arm 22 includes a latching portion 24 extending from a free end of the elastic arm 22. An aperture 11 is defined in the plate 10 between each pair of latches 20. The elastic arms 22 of each pair of latches 20 are extended toward two opposite directions, and the latching portions 24 of each pair of latches 20 are oriented toward the opposite latches 20. Each pair of latches 20 cooperatively define a guiding slot 26 therebetween for receiving the wire 30.

Figure 2:
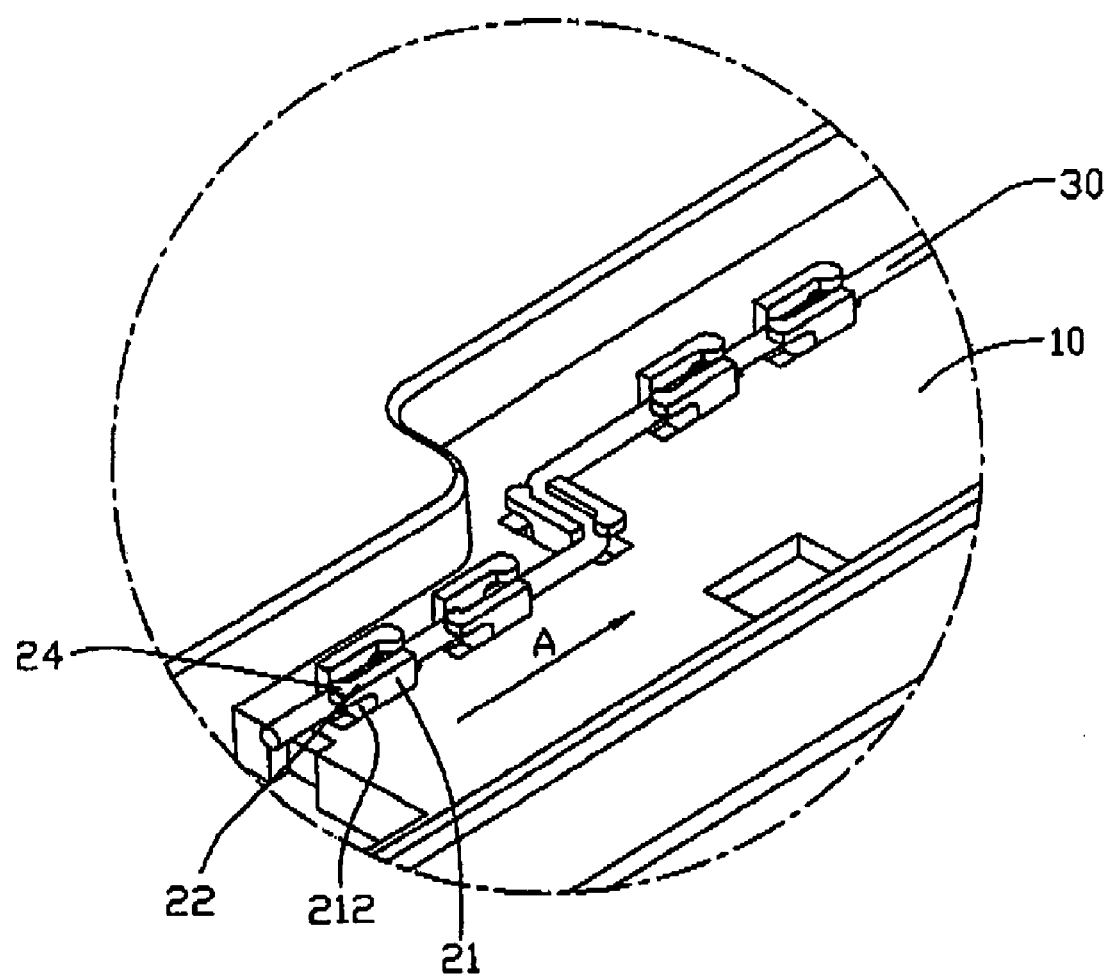
FIG. 2 is an assembled view of FIG. 1.

Referring also to FIG. 2, in assembly, the wire 30 is pressed into the guiding slots 26 of the pairs of latches 20 on the plate 10, and the elastic arms 24 of each pair of latches 20 are deformed outward. The latching portions 24 of each pair of latches 20 press against the top of the wire 30 when the elastic arms 24 rebound, thereby the wire 30 is fixed in place.

To detach the wire 30 from the plate 10, the wire 30 is pulled up, which urges the latches 20 to deform away from each other, and the wire 30 is easily taken out by an operator.

Furthermore, the latches 20 can be arranged in many different patterns other than depicted in FIG. 2 according to desired paths for the one or more wires on any surface, within or without, of the electronic device. Further, the latches 20 need not be symmetrically aligned as in the preferred embodiment but rather, may be aligned offset from each other.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A wire holder for fixing a wire on a plate of an electronic device, the wire holder comprising:

a pair of latches formed on the plate defining a guiding slot therebetween in a lateral direction for containing the wire, each of the latches comprising a main body defining an end surface perpendicular to the lateral direction, an elastic arm extending from the end surface of the main body in the lateral direction, and the elastic arm comprising a latching portion extending from a free end thereof into the guiding slot for hooking the wire.

2. The wire holder as claimed in claim 1, wherein the end surfaces of the latches offset to each other, and the elastic arms of the pair of latches extend oppositely.

3. The wire holder as claimed in claim 1, wherein each of the latches is generally L-shaped, and the elastic arm of each of the latches overhangs the plate.

4. The wire holder as claimed in claim 1, wherein an aperture is defined in the plate between the pair of latches.

5. A wire holder configured to fix a wire on a plate of an electronic device, comprising:

a pair of latches formed on the plate with a guiding slot defined therebetween for containing the wire, the guiding slot extending in a lateral direction, each of the latches comprising a main body defining two opposite end surfaces spaced from each other in the lateral direction, an elastic arm extending from one of the end surfaces of the main body away from the other end surface in the lateral direction, the elastic arm comprising a latching portion extending from a distal end thereof into the guiding slot configured to bias the wire against the plate.

6. The wire holder as claimed in claim 5, wherein the latching portions of the latches space from each other in the lateral direction.

7. The wire holder as claimed in claim 5, further comprising another pair of latches formed on the plate, said another pair of latches defining therebetween a slot extending in a direction different from the lateral direction configured to retain the wire.

* * * * *